United States Patent Office.

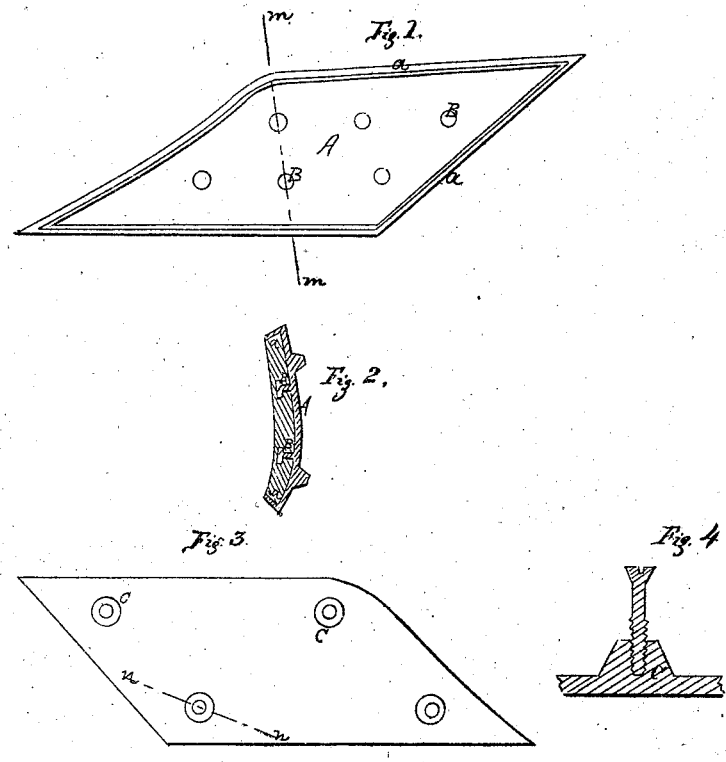

RICHARD GAINES AND MELCHI SCOTT, OF FAIRFIELD, IOWA.

Letters Patent No. 74,679, dated February 18, 1868.

IMPROVEMENT IN PLOUGH-MOULD BOARDS.

The Schedule referred to in these Letters Patent and making part of the same.

TO ALL WHOM IT MAY CONCERN:

Be it known that we, RICHARD GAINES and MELCHI SCOTT, of Fairfield, in the county of Jefferson, and State of Iowa, have invented new and useful Improvements in "Plough-Mould Boards;" and we do hereby declare that the following is a full and exact description thereof, reference being had to the accompanying drawings, making part of this specification.

The nature of our invention consists in combining metal and glass, for producing a plough-mould board, in the manner as will be hereinafter fully explained.

A metallic mould-board, A, made of suitable thickness, is provided all along its edges with a V-shaped groove, $a\ a$, on its concave side, and also with metallic studs or buttons, B B, on the same side, and of the shape as represented in the drawing, said groove and studs being made for the purpose of firmly securing the glass to the mould-board, when the same is uniformly applied to or cast over that concave side of the mould-board in its molten state. On the back or convex side of the iron mould-board we make several protuberances or knobs, C C, provided with screw-thread inside, for the purpose of admitting the ends of the screws with which the mould-board may be secured to the plough.

Being aware that the plough-mould boards made entirely of glass have been claimed by others,

What we claim as our invention, and desire to secure by Letters Patent, is—

1. The metallic plough-mould board A, provided with V-shaped groove along the edges, and studs or buttons B B on its concave surface, in combination with glass cast over said surface in its molten state, substantially as herein set forth and specified.

2. The protuberances or knobs C C, arranged as described, for the purpose of securing the mould-board to the plough, substantially as set forth, in combination with the above-described mould-board.

RICHARD GAINES,
MELCHI SCOTT.

Witnesses:
DAVID HERON,
J. N. ROBINSON.